(12) United States Patent
Noll

(10) Patent No.: US 6,281,788 B1
(45) Date of Patent: Aug. 28, 2001

(54) INDICATING INSTRUMENT

(75) Inventor: Heinrich Noll, Gross-Umstadt (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/651,399

(22) Filed: Aug. 29, 2000

(30) Foreign Application Priority Data

Sep. 13, 1999 (DE) .............................................. 199 43 578

(51) Int. Cl.⁷ ........................................................ G09F 9/00
(52) U.S. Cl. ........................ 340/461; 340/459; 313/510; 362/489
(58) Field of Search ..................................... 340/459, 461, 340/462; 362/23, 487, 489; 313/498, 510

(56) References Cited

U.S. PATENT DOCUMENTS

| 5,592,037 | * | 1/1997 | Sickafus | 310/268 |
| 5,780,965 | * | 7/1998 | Cass et al. | 313/506 |
| 5,821,688 | * | 10/1998 | Shanks et al. | 313/498 |
| 5,952,789 | * | 9/1999 | Stewart et al. | 315/169.4 |
| 5,971,557 | * | 10/1999 | Kubes et al. | 362/24 |
| 6,120,159 | * | 9/2000 | Inoguchi et al. | 362/29 |

FOREIGN PATENT DOCUMENTS

| 19502541 | 8/1996 | (DE) . |
| 19502542 | 8/1996 | (DE) . |
| 19708610 | 9/1998 | (DE) . |

* cited by examiner

Primary Examiner—Edward Lefkowitz
(74) Attorney, Agent, or Firm—Martin A. Farber

(57) ABSTRACT

In an indicating instrument (1) for a motor vehicle, a light-emitting polymer (8) enclosed between two electrodes (9, 10) serves as the light source. The polymer (8) can at the same time be activated by a suitable segmentation in such a way that a direct representation of symbols or alphanumeric characters is permitted, with at the same time high image sharpness and great brightness. The indicating instrument (1) can therefore be operated with the polymer (8) as a commonly shared light source, with the low overall height permitting reduced outer dimensions of the indicating instrument (1).

11 Claims, 1 Drawing Sheet

INDICATING INSTRUMENT

FIELD AND BACKGROUND OF THE INVENTION

The invention concerns an indicating instrument which is intended for a motor vehicle and has an illuminable display with a light-emitting substance which can be activated between two electrodes.

In the case of such indicating instruments, for indication purposes it is generally necessary to provide display areas which, in simple configurations, visually present the current situation to the user merely by means of a correspondingly illuminable character. While in the past respectively separate filament lamps together with a corresponding shield were used for this purpose, nowadays increasing use is being made of light sources which, apart from a low overall height and high operational reliability, also particularly permit illumination over a surface area.

A corresponding display has been realized for example by a substance consisting of phosphorus being induced to produce light emission by means of the two electrodes. By appropriate shaping of the electrodes or of the phosphorus layer, this allows characters or symbols to be depicted without an additional shield, then appearing for example as a light area before a dark background. In a similar configuration, background illumination is also provided, so that the characters or symbols become visible due to their contrasting color before an illuminated background.

When such illuminating means have been used in practice, it has proven to be disadvantageous that the customary indicating instruments usually have not only those displays which represent simple switching states, such as for example on/off, but in addition also other forms of representation such as pointer instruments, illuminated strips and increasingly also liquid crystal displays (LCDs), which each require a type of illumination matched specifically to them. For example, liquid crystal displays require transmitted-light illumination, in which the light spectrum undergoing a change as it passes through has to be taken into consideration, while dials for pointer instruments require uniform illumination of the scaling and possibly also active illumination of their pointer vane in a contrasting color. Furthermore, it is increasingly desired from design considerations for the indicating instrument to have a dark surface, so that the display only becomes visible to the viewer by means of corresponding illumination and thereby permits information to be provided on an individual, need-related basis.

There have already been attempts to illuminate the different components simultaneously by means of the actively illuminating display, in order in this way to simplify the construction and obviate the need for additional light sources. In practice, it has proven disadvantageous in this respect that either the luminous intensity of the display was not adequate, or was so only in a certain color spectrum, for illuminating further displays, or else the possibilities for shaping the displays were greatly restricted, so that the area of application was considerably restricted. In addition, undesired light changes occur at the interfaces of neighboring displays, leading to an inferior visual appearance of the indicating instrument.

SUMMARY OF THE INVENTION

The invention is therefore based on the problem of providing an indicating instrument of the type stated at the beginning in such a way that simple illumination of the display is achieved.

This problem is solved according to the invention by the substance being a light-emitting polymer (organic LED, abbreviation: OLED), which is designed such that it can be activated both for the background illumination and for the representation of image dots or characters.

As a result, the polymer can be used in the indicating instrument as a commonly shared light source for displays with any desired forms of representation. The high luminous intensity which can be achieved with the polymer also at the same time permits unproblematical transmitted-light illumination of liquid crystal displays. Furthermore, this also allows a so-called black panel display to be realized, in which the plane of representation of the display is exclusively visible when the illumination is switched on, whereas the front side of the indicating instrument appears as a substantially dark surface when the illumination is not switched on. At the same time, the polymer has a comparatively low overall height, so that in particular very flat embodiments of the indicating instrument can also be achieved, with an extended area of use. The polymer may in this case serve both for illuminating further displays and, by itself being shaped for example in the form of a symbol or a figure, directly as the display itself, in that the area determined by the figure or symbol is highlighted against the background when it is correspondingly activated. The polymer, also known as LEP (Light Emitting Polymer) or OLED (Organic Light Emitting Diode, see above), also has a low energy consumption and is easier to read by virtue of its increased viewing angle. At the same time, the entire light spectrum can be depicted, so that in particular there is no longer any need for light filters. Furthermore, the high response rate permits a quickly changing image sequence, so that in particular information relevant to safety as well can be reliably displayed by means of the polymer.

A particularly advantageous embodiment of the invention is provided by the electrodes being produced from a plastic. This allows the laminated construction of the indicating instrument to be further reduced in its overall height, in that the electrodes are for example made in the form of foil. At the same time, this allows the weight of the indicating instrument to be reduced, so that a much extended area of use is obtained.

The indicating instrument according to the invention advantageously also has a high mechanical stability with lower overall height if the electrodes are each applied to a substrate of plastic or glass.

At the same time, a particularly favorable development of the invention is provided by the electrodes and the polymer enclosed between them being capable of being shaped. This allows an indicating instrument which can be optimally adapted to the surface characteristics of the dashboard of the motor vehicle to be realized. Apart from the attractive visual appearance associated with this, a shaping of the indicating instrument adapted to visual capabilities and external influences in the interior compartment of the motor vehicle and at the same time improved ease of reading and consequently increased safety are achieved. For example, this allows disturbing reflections on the front side of the indicating instrument to be avoided in a simple way.

The indicating instrument may be provided exclusively with displays which visually present the desired information to the user only by their activation as an illuminated or non-illuminated region. On the other hand, another particularly advantageous embodiment of the invention is achieved by the indicating instrument having a pointer instrument. In this way, information can be presented in the conventional way and can be registered by the user even from a quick glance. At the same time, the polymer permits illumination of the background over a surface area, it also being possible for the pointer instrument to be integrated into the indicating instrument in such a way that it is highlighted against the background, and consequently readable, only when the illumination is switched on. In addition, the pointer of the pointer instrument may also be actively illuminable—for example by means of OLEDs applied to its vane.

Particularly well suited for this is a configuration of the indicating instrument according to the invention in which the polymer has an opening for a pointer spindle intended for the deflection of a pointer vane of the pointer instrument. This allows the pointer vane to be arranged such that it can pivot a small distance in front of the polymer, so that a sharp contrast between the pointer vane and the background, and consequently improved readability, is obtained. At the same time, the non-illuminable area is restricted to the opening for the pointer vane, so that a uniform illumination with a comparatively high luminous density can be realized.

Another particularly advantageous embodiment of the invention is obtained if the rear electrode is designed at the same time as a carrier for the drive (for example measuring mechanism, stepping motor) of the pointer instrument. This reduces the number of required components of the indicating instrument, so that, apart from lower production expenditure, reduced dimensions can also be realized. The rear electrode is in this case produced for example from a correspondingly reinforced plastics material and may have additional fixing means. For example, the rear electrode may for this purpose also be designed as a rigid printed circuit board or partially reinforced flexible printed circuit board.

It is conceivable to provide in the indicating instrument according to the invention a display (for example LCD) with activatable segments, which display is illuminated over its surface area by the light-emitting polymer. On the other hand, it is of particular advantage if the light-emitting polymer has in at least a subregion a display with activatable display segments and/or with an activatable dot matrix, so that the light-emitting polymer itself acts as the display, reducing the number of components of the indicating instrument and reducing its overall height.

A favorable embodiment of the invention is also obtained by the display having a segmentation for the optional activation of individual segments of the display. As a result of this, alphanumeric characters or a dot matrix can be represented by individual, correspondingly activated dots or regions in a way similar to a liquid crystal display. The individually selectable form of representation achieved as a result permits not only use of the indicating instrument for different purposes but also a flexible selection of the form of representation by the user. For example, the information to be displayed can be arranged in the order of its relevance and can be made variable in the size of representation. An arrangement in the form of a plurality of "windows", which are arranged on various levels and the arrangement of which can for example also be determined by the user, is also possible here without any problem.

The indicating instrument according to the invention could have a monochrome illumination and/or displays in the same color. According to another development of the invention, it is of particular advantage, however, if, dependent on the choice of polymer material for the light-emitting polymer and/or on the activation voltage of the light-emitting polymer, the entire spectrum of visible light can be optionally emitted by the light-emitting polymer. In this way, the color can be switched over and/or a color display is made possible for clearer representation of information.

According to another advantageous development of the invention, the luminous density of the light which can be emitted by the light-emitting polymer reaches a value above $1000\ cd/m^2$. In this way, even when there is great ambient brightness, as occurs for example when there is sunlight shining directly on the instrument, the indicating instrument can even be read well, increasing road safety. On the other hand, it is conceivable to reduce the luminous density by dimming to values below $1000\ cd/m^2$ when there is little brightness (for example darkness at night), so that a vehicle driver is not dazzled by the instrument.

BRIEF DESCRIPTION OF THE DRAWING

The invention allows various embodiments. For further illustration of its basic principle, two of these are represented in the figures of the drawing and described below. In the schematic representation of the drawing.

DETAILED DESCRIPTION OF THE PREFERRED EMBODIMENT

Figure 1:
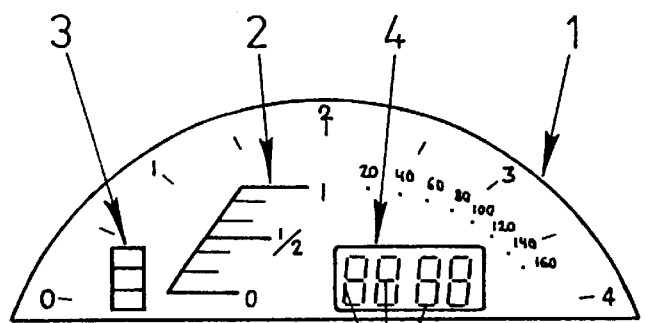
FIG. 1 shows a plan view of an indicating instrument according to the invention.

FIG. 1 shows in a plan view an indicating instrument 1 of a motor vehicle. The indicating instrument 1 is provided with various displays 2, 3, which serve for example for representing the tank content, the coolant temperature or the speed of the motor vehicle at a given time. Furthermore, the indicating instrument 1 has a display 4 in which individual segments 5 can be activated independently and thus permits any desired representation of alphanumeric characters or symbols.

Figure 2:
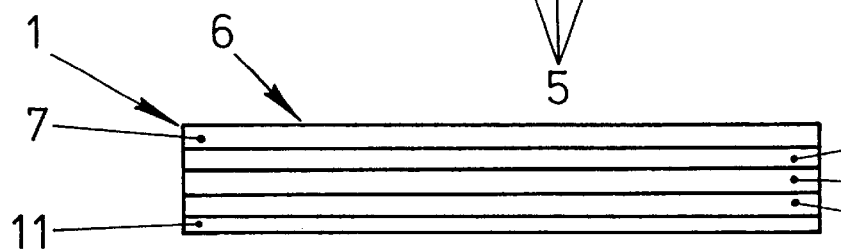
FIG. 2 shows the indicating instrument shown in FIG. 1 in a sectioned side view.

FIG. 2 shows the construction of the indicating instrument 1 in a sectioned side view. The individual levels can be seen, a substantially transparent covering 7 being provided on a front side 6 of the indicating instrument 1. A light-emitting polymer 8 is enclosed between a transparent front electrode 9 and a rear electrode 10. A corresponding activation of the electrodes 9, 10 leads to a change in the charge of the polarized electrodes 9, 10, charges that meet one another emitting their energy in the form of a light emission. A rear covering 11 is designed at the same time as a housing element of the indicating instrument 1.

Figure 3:
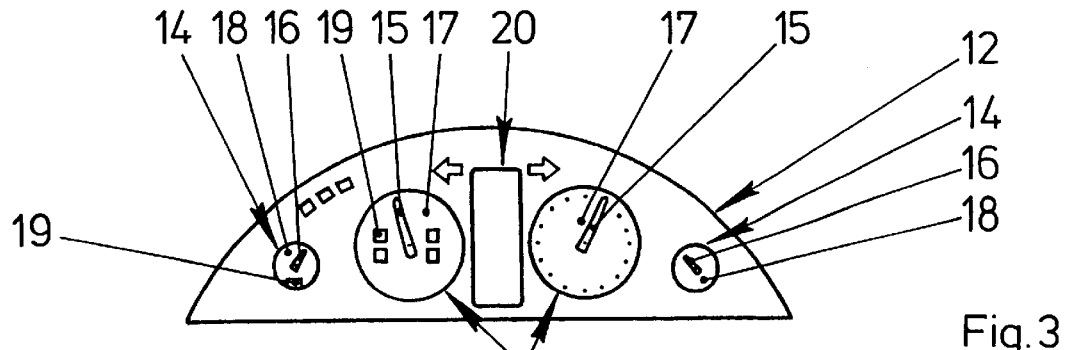
FIG. 3 shows an indicating instrument provided with various pointer instruments.

FIG. 3 shows in a plan view a configuration of an indicating instrument 12 modified in comparison with the above. In comparison with the indicating instrument 1 represented in FIG. 1, the indicating instrument 12 is additionally provided with various pointer instruments 13, 14, which permit a conventional, analog representation. The pointer instruments 13, 14 each have for this purpose a pointer vane 15, 16, which are respectively arranged such that they can pivot in front of a dial 17, 18, which can be illuminated by a polymer (not represented). The dials 17, 18 are for their part each provided with various displays 19, formed by individually activatable regions, so that in particular a representation of information dependent on the deflection of the pointer vane 15, 16 is achieved.

In addition, the indicating instrument 12 has a display 20 designed as a dot matrix display, which permits any desired form of representation, for example including moving images, in a way similar to a liquid crystal display.

Figure 4:
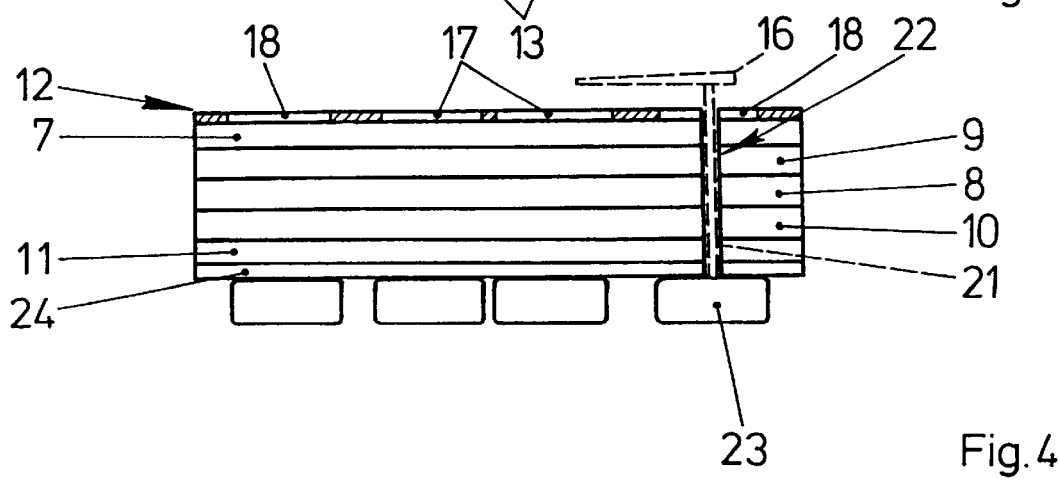
FIG. 4 shows the indicating instrument shown in FIG. 3 in a sectioned side view.

The construction of the indicating instrument 12 is further represented on the basis of FIG. 4, which shows the indicating instrument 12 in a sectioned side view. In addition to the coverings 7, 11, which coincide and are shown in FIG. 2, and the polymer 8, which is enclosed between the two electrodes 9, 10, the dials 17, 18 are arranged on the front side of the indicating instrument 12, with dashed lines being used to represent by way of example the pointer vane 16 which can pivot in front of the dial 18 about a pointer spindle 21. For this purpose, an opening 22 is provided for receiving the pointer spindle 21 in such a way that it can move, with a measuring mechanism 23 that deflects the pointer vane 16 being fixed to the rear side of a printed circuit board 24 of the indicating instrument 12.

The indicating instruments 1, 12 are not restricted here to use as an instrument cluster in the region of a dashboard of the motor vehicle. In particular, the flexible form of representation and the freedom with which they can be shaped, with even multiply curved surfaces been feasible without a problem, allow a wide area of use. Consequently, simple indicating instruments can be used for example together with electrical setting elements or selection switches for functional control.

What is claimed is:

1. An indicating instrument for a motor vehicle, comprising an illuminable display with a light-emitting substance which is activatable between two electrodes, wherein the substance is a light-emitting polymer (8), which is provided such that it is activatable both for background illumination and for representation of image dots or characters.

2. The indicating instrument as claimed in claim 1, wherein the electrodes (9, 10) are made of plastic.

3. The indicating instrument as claimed in claim 1, wherein the electrodes (9, 10) are each applied to a substrate (7, 11) of plastic or glass.

4. The indicating instrument as claimed in claim 1, wherein the electrodes (9, 10) and the polymer (8) enclosed between said electrodes are shapable.

5. The indicating instrument as claimed in claim 1, wherein the indicating instrument (12) further comprises a pointer instrument (13, 14).

6. The indicating instrument as claimed in claim 5, wherein the polymer (8) has an opening (22) for a pointer spindle (21) for deflection of a pointer vane (16) of the pointer instrument (14).

7. The indicating instrument as claimed in claim 5, wherein a the rear of said electrodes (10) is at same time a carrier for a drive of the pointer instrument (13, 14).

8. The indicating instrument as claimed in claim 1, wherein the light-emitting polymer (8) has in at least a subregion a display (4, 20) with activatable display segments (5) and/or with an activatable dot matrix.

9. The indicating instrument as claimed in claim 1, wherein the display (4) has a segmentation for optional activation of individual segments (5) of the display (4).

10. The indicating instrument as claimed in claim 1, wherein, dependent on a selection of polymer material for the light-emitting polymer (8) and/or on activation voltage of the light-emitting polymer (8), entire spectrum of visible light optionally is emittable by the light-emitting polymer (8).

11. The indicating instrument as claimed in claim 1, wherein luminous density of light which is emittable by the light-emitting polymer (8) has a value above 1000 cd/m$^2$.

* * * * *